Jan. 1, 1924 1,479,111
J. SLOMER
EMERGENCY TIRE FOR VEHICLE WHEELS
Filed Jan. 3, 1922
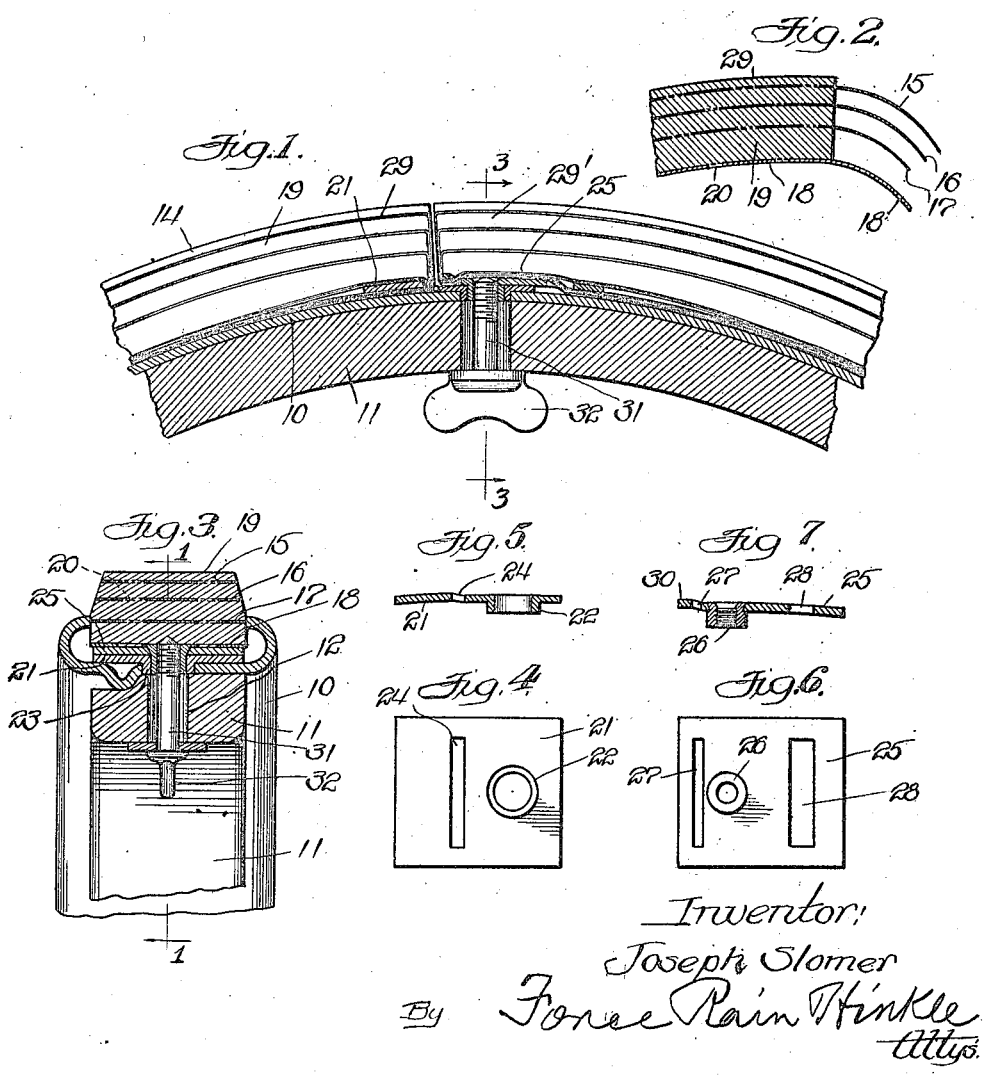

Patented Jan. 1, 1924.

1,479,111

UNITED STATES PATENT OFFICE.

JOSEPH SLOMER, OF WAUKEGAN, ILLINOIS.

EMERGENCY TIRE FOR VEHICLE WHEELS.

Application filed January 3, 1922. Serial No. 526,470.

*To all whom it may concern:*

Be it known that I, JOSEPH SLOMER, a citizen of the United States, residing at Waukegan, in the county of Lake and State of Illinois, have invented certain new and useful Improvements in Emergency Tires for Vehicle Wheels, of which the following is a specification.

This invention relates to improvements in emergency tires for vehicle wheels.

One of the objects of the invention is to provide a tire for vehicle wheels which may quickly be utilized in an emergency.

Another object is to provide a cushion tire which is normally straight, to be curved to fit in the rim of the wheel at the time of its application and, therefore, which will occupy a small space when not in use.

Another object is to provide an emergency tire which may be applied to the rim of the standard wheel without the necessity for mutilating or changing any part thereof.

Another object is to provide means for increasing frictional contact between the tire and sides of the rim on that part of the tire at the time bearing the load to prevent circumferential displacement thereof.

Another object is, generally, to improve devices of this character.

Other objects and advantages of the invention will become readily apparent to persons skilled in the art, from a consideration of the following description when taken in conjunction with the drawings, wherein:—

Fig. 1 is a section taken on line 1—1 of Fig. 3.

Fig. 2 is a view of broken-away ends of the tire in circumferential section.

Fig. 3 is a transverse section taken on line 3—3 of Fig. 1.

Fig. 4 is a plan view of the clip to be attached to one end of the tire.

Fig. 5 is a central section thereof.

Fig. 6 is a plan view of another clip to be attached to the other end of the tire.

Fig. 7 is a central section thereof.

In all the views the same reference characters are employed to indicate similar parts.

In the drawings 10 is the usual clincher rim mounted upon the felly 11. The felly is provided with an opening 12 thru which the valve stem of the inner tube of the ordinary pneumatic tire projects.

The emergency tire herein disclosed is to be used in the place of the ordinary pneumatic tire for temporary service in order that the car may be driven to the nearest garage or to the home of the driver without injury to the rim.

The tire consists of an elongated strip or slab of rubber 14, or other suitable flexible material, having a series of fabric strips 15, 16 and 17, attached to the ends thereof or vulcanized therein. These strips may extend from the ends of the tire 14 and from points sufficiently inwardly thereof to be firmly held in place, and another strip 18, is vulcanized to the bottom surface of the tire. In order that the rubber portions 19 may be homogeneous throughout, the strips are, preferably, perforated, as at 20, so that the rubber may key thru the perforations so as to avoid the danger of disconnected laminations of the rubber parts.

The fabric tape or strips 15 to 18 inclusive, as more clearly shown in Fig. 2, extend from the tire 14, or overhang the ends at each end thereof. A clip 21, made of steel or other suitable metal, is provided with a hub 22 which neatly fits a valve stem receiving hole 23 that passes thru the central portion of the rim 10. The clip 21 is provided with a slot 24. The fabric strips or tapes 15 to 18, inclusive, on the end 29 of the tire, are gathered together, as shown in Fig. 1, and passed thru the slot 24 of the clip 21, and carried backwardly and caused to lie on the inside of the rim, at which time the hub 32 is placed in the opening 23 of the rim and the tire 14 is carried around the rim. Another clip 25 of similar character as the clip 21, is provided with a threaded hub 26.

The hub 26 of the clip 25 neatly fits inside of the hub 22 of the clip 21. The clip 25 is provided with two slots, 27 and 28. The tapes 15 to 18, inclusive, on the tire end 29', are passed underneath the clip 25 and the end 30, then thru the opening 27 and over the top of the clip thru the opening 28, and thence against the inner side of the tire, after which the tire is drawn tightly over and into the rim and the hub 26 is forced inside of the hub 22, after which a screw 31 is passed thru the opening 12 in the felly 11, and the thumb nut 32 is the means by which the screw may readily be rotated, whereupon the hub 26 is drawn firmly inwardly by the screw and thereby the clips 21 and 25 are held in place and the ends 29 and 29' of the tire are held down in place by the fabrics or strips 15 to 18, inclusive; both ends of the tire being in this manner held in place.

To remove the tire it is only necessary to withdraw the screw 31, whereupon the clips may be removed from the opening 23 in the rim and thereafter the tire may thus be displaced.

When the tire 14 is removed from the rim it is normally straight and, therefore, occupies very small space in the car and may be coiled into small dimensions and transported and carried in the car.

The sides of the tire lie in close contact with the inturned edges of the rim, so that when that portion of the tire that takes the weight and torque effort of the wheel is expanded laterally by the weight the friction between these parts is thereby increased tending to prevent circumferential displacement of the tire, by the torque effort imparted thereto.

I have herein described the tire as being made of rubber. It is, however, manifest that any other suitable resilient material may be employed, and instead of the strips 15 to 18 being of fabric, such as unbleached linen, or the like, they may be of other suitable material well adapted for the purpose.

While I have herein shown a single embodiment of my invention for the purpose of clear disclosure, it will be manifest to persons skilled in the art, that considerable change may be made in the general arrangement and configuration of the parts, within the scope of the appended claims.

Having described my invention what I claim as new and desire to secure by Letters Patent, is:—

1. An emergency tire for attachment on a standard wheel rim, comprising a flexible, elongated body encompassing the rim and having a flexible strip extending from each end of the tire; a clip at each end of the tire to which the strips are connected, respectively, and a screw for extension thru the valve opening in the rim to hold the clips in place on the rim.

2. An emergency tire for attachment on a standard wheel rim comprising a flexible, elongated, normally straight rubber body to encompass the rim and each end having a flexible strip vulcanized thereto; a clip for each end, each clip having a slot thru which the respective strips are to be passed in application of the tire to the rim and means for connecting the clips to the rim.

3. The combination with a wheel rim of the clincher type of an elongated body of rubber lying within the rim; a plurality of flexible strips vulcanized to each end of said rubber body and overlying clips within the rim, attached respectively to said strips and a screw passing thru the rim and said clips to hold the ends of the elongated body of rubber in place in the rim.

In testimony whereof I hereunto subscribed my name.

JOSEPH SLOMER.